United States Patent
Bresciani et al.

(10) Patent No.: US 12,473,082 B2
(45) Date of Patent: Nov. 18, 2025

(54) LANDING GEAR FOR A VERTICAL TAKE-OFF AND LANDING AIRCRAFT

(71) Applicant: Lilium GmbH, Wessling (DE)

(72) Inventors: Luca Mario Bresciani, Wessling (DE); Dieter Pestal, Wessling (DE); Sebastian Born, Wessling (DE); Richard Bergeron, Wessling (DE)

(73) Assignee: Lilium GmbH, Wessling (DE)

( * ) Notice: Subject to any disclaimer, the term of this patent is extended or adjusted under 35 U.S.C. 154(b) by 0 days.

(21) Appl. No.: 18/494,621

(22) Filed: Oct. 25, 2023

(65) Prior Publication Data

US 2024/0300639 A1 Sep. 12, 2024

(30) Foreign Application Priority Data

Mar. 6, 2023 (EP) .................................... 23160297

(51) Int. Cl.
*B64C 25/20* (2006.01)
*B64C 25/58* (2006.01)

(52) U.S. Cl.
CPC .............. *B64C 25/58* (2013.01); *B64C 25/20* (2013.01)

(58) Field of Classification Search
CPC ......... B64C 25/02; B64C 25/08; B64C 25/10; B64C 25/18; B64C 25/20; B64C 25/58; B64C 25/60; B64C 25/62; B64C 25/64
USPC .................................................. 244/102 R
See application file for complete search history.

(56) References Cited

U.S. PATENT DOCUMENTS

| | | | | |
|---|---|---|---|---|
| 2,559,451 A | * | 7/1951 | Mcbrearty | B64C 25/14 188/289 |
| 2,563,518 A | * | 8/1951 | Dickerman | B64C 25/60 267/64.22 |
| 3,017,143 A | * | 1/1962 | Hartel | B64C 25/22 244/102 R |
| 3,822,048 A | | 7/1974 | Hartel | |

(Continued)

FOREIGN PATENT DOCUMENTS

| | | | | |
|---|---|---|---|---|
| CN | 112722251 A | * | 4/2021 | B64C 25/52 |
| KR | 2012 0044602 A | | 5/2012 | |
| KR | 1850217 B1 | * | 4/2018 | B64C 25/60 |

OTHER PUBLICATIONS

Extended European Search Report for Application No. 23160297.1, dated Aug. 3, 2023 (4 pages).

*Primary Examiner* — Joshua E Rodden
(74) *Attorney, Agent, or Firm* — Nixon Peabody LLP

(57) ABSTRACT

A landing gear for an aircraft includes a wheel, a shock absorber, and an attachment lever. Spaced apart absorber and lever connections connect to the aircraft fuselage. The wheel is attached to the attachment lever spaced apart from the lever connection. The shock absorber is connected to the wheel directly or indirectly via a wheel connection to provide a load path for vertical load from the wheel to the absorber connection. The shock absorber includes a fuse pin at the absorber connection and/or the wheel connection having a predetermined breaking load to break and release the connection. In an extended landing position, the wheel connection is located rearward of the absorber connection relative to a forward direction of the aircraft. The attachment lever includes a rotary bearing providing a folding movement for the wheel from the extended landing position into a crash position when the fuse pin breaks.

13 Claims, 6 Drawing Sheets

(56) References Cited

U.S. PATENT DOCUMENTS

| | | | | |
|---|---|---|---|---|
| 4,155,522 | A * | 5/1979 | Sealey | B64C 25/10 |
| | | | | 244/102 R |
| 4,189,117 | A * | 2/1980 | Masclet | B64C 25/10 |
| | | | | 244/102 R |
| 4,422,604 | A * | 12/1983 | Turiot | B64C 25/34 |
| | | | | 244/102 R |
| 4,537,374 | A * | 8/1985 | Barnoin | F16F 7/125 |
| | | | | 188/371 |
| 4,681,284 | A * | 7/1987 | Veaux | B64C 25/14 |
| | | | | 244/102 R |
| 5,337,976 | A * | 8/1994 | Derrien | B64C 25/14 |
| | | | | D12/345 |
| 6,679,452 | B1 | 1/2004 | Cottet | |
| 7,066,429 | B2 | 6/2006 | Mellor | |
| 7,274,310 | B1 * | 9/2007 | Nance | B64C 25/60 |
| | | | | 340/960 |
| 7,407,134 | B2 * | 8/2008 | Bietenhader | B64C 25/04 |
| | | | | 244/119 |
| 7,575,193 | B2 * | 8/2009 | Payen | B64C 25/14 |
| | | | | 244/102 R |
| 8,439,304 | B2 | 5/2013 | Mairou | |
| 8,539,843 | B2 | 9/2013 | Inns | |
| 10,766,607 | B2 * | 9/2020 | Sakota | B64C 25/12 |
| 11,130,563 | B2 * | 9/2021 | Heer | F16C 11/06 |
| 12,084,169 | B2 * | 9/2024 | Saccoccia | B64C 25/58 |
| 12,097,950 | B2 * | 9/2024 | Venn | B64C 25/26 |
| 12,097,951 | B2 * | 9/2024 | Bishop | B64C 25/58 |
| 2006/0226286 | A1 * | 10/2006 | Hawkins | B64C 25/30 |
| | | | | 244/102 R |
| 2019/0161175 | A1 * | 5/2019 | Satira | B64C 25/12 |
| 2023/0373615 | A1 * | 11/2023 | Bishop | B64C 25/58 |

* cited by examiner

LANDING GEAR FOR A VERTICAL TAKE-OFF AND LANDING AIRCRAFT

CROSS-REFERENCE TO RELATED APPLICATIONS

This application claims the benefit of and priority to European Patent Application No. 23160297.0, filed Mar. 6, 2023, which is hereby incorporated by reference herein in its entirety.

FIELD

The present invention is related to a landing gear for a vertical take-off and landing aircraft as well as an aircraft equipped with at least one of those landing gears.

BACKGROUND

It is known that aircrafts need a landing gear provided with at least one wheel or any other element that allows moving of the aircraft to take-off and land as well as to move while on ground. Such a landing gear usually provides shock absorbing functionality for the case that during the landing process a vertical force is applied to the landing gear that needs to be absorbed before it reaches the fuselage of the aircraft. For regular aircrafts as well as for vertical take-off and landing aircrafts one issue is to ensure that in a crash situation, when the vertical load of a landing situation increases significantly, this is not resulting in any harm for the interior and the passengers inside of the aircraft. For regular aircrafts as well as for vertical take-off and landing aircrafts used for passenger transport a so-called piercing of the cabin needs to be avoided by any means. Since the location of the landing gear below the cabin of such an aircraft is preferred in terms of optimized aerodynamics as well as reduced weight and stability in ground operations the risk of piercing the cabin and the risk of parts of the landing gear entering the cabin in general exists. Of course, also other positions for the landing gear are possible with the risk of damaging any components above, for example a wing, a fuel tank or the like.

Present technologies usually comprise either a piercing protection for example a rigid steel plate between the landing gear and the cabin to avoid and/or reduce the piercing risk. Such an additional steel protection increases the weight and thereby the energy consumption during use of the aircraft. The other possibility to avoid the risk of piercing the cabin is to move the landing gear to a position which is spaced apart from the cabin and thereby in a crash situation the piercing will not be close to the cabin but for example would still damage the wings or other close components. This means that either additional weight and complexity or a reduced freedom of construction needs to be applied to reduce or even avoid the risk parts of the landing gear piercing the cabin of an aircraft.

It is an object of the present invention to overcome the disadvantages described above at least partly. In particular it is an object of the present invention to provide an easy and cost-efficient solution to avoid a piercing of the cabin in an overload or crash situation and thereby increase the cabin safety.

Aforesaid problem is solved by a landing gear with the features of independent claim 1 as well as an aircraft with the features of independent claim 13. Technical features mentioned in the sub claims can be combined with the features of the independent claims.

SUMMARY

According to the present invention a landing gear is provided for a vertical take-off and landing aircraft. The landing gear comprises a wheel, a shock absorber with an absorber connection to connect to the fuselage of the aircraft as well as at least one attachment lever with a lever connection also to connect to the fuselage of the aircraft. The lever connection is spaced apart from the absorber connection. Further a wheel is provided being attached to the attachment lever spaced apart from the lever connection wherein the shock absorber is connected to this wheel directly or indirectly via a wheel connection to provide a load path for a vertical load from the wheel to the absorber connection. Additionally, such shock absorber comprises a fuse pin at the absorber connection and/or the wheel connection having a predetermined breaking load to break and release the connection at the absorber connection and/or the wheel connection. The attachment lever further comprises a rotary bearing providing a folding movement for the wheel as well as the attachment lever from an extended landing position into a crash position when the fuse pin breaks.

According to the present invention the landing gear is provided with two general functionalities. One is the absorbing functionality which is used in a regular landing situation which is described in the following passage. Of course, the inventive landing gear could also be used in an aircraft with regular landing and take-off functionality. Additionally, it has to be noted that a wheel according to the present invention can also be substituted by any other element that allows moving of an aircraft without leaving the scope of the present invention. For example, a skid, a slider or the like could be used as a wheel in the meaning of the present invention. A fuse pin according to the present invention can be constructed in different ways. It could also comprise or be embodied by a lug-element that is deformable and/or can break completely. Also a combination of a deformation that is followed by a full break of the element is covered by the scope of the present invention.

The landing gear is usually placed beneath the cabin of the aircraft. Of course, also other positions are possible, for example below the wings. When the aircraft approaches a landing situation it reduces altitude and during the landing process will touch the ground first with the landing gear and particular with the wheel. While the uplifting force generated by rotors and/or by the aerodynamics of wings is further reduced, the aircraft will put its full weight on the wheel and thereby the force along the load path of the landing gear is increased. In particular when there is a hard landing or a quick decrease in altitude this force is higher than the weight load provided by the aircraft itself. All of those additional forces are absorbed by the shock absorber so that the comfort of the passengers inside of the cabin of the aircraft is increased. Again, this is true for a regular aircraft as well as an aircraft for vertical take-off and/or landing.

In case of an emergency landing or even an uncontrolled crash situation, that landing force can increase significantly. For example, if the uplifting force is far too low and the decreasing of altitude is too quick, the aircraft can basically crash on the ground and thereby the shock absorber is not sufficiently large to absorb that high crash force. In the commonly known aircrafts, the landing gear in such phase would fail and this would lead to parts of the complete landing gear to deform and partly pierce anything that is above the landing gear. In the case a landing gear that is located under the cabin of the aircraft such landing gear in a crash situation thereby would pierce the cabin from below and would at least partly enter the cabin risking to cause harm to the passengers inside of that cabin. It further could obstruct an exit path or even cause damage in opening mechanisms of emergency exists. Depending on the position of the landing gear also other damages could appear, like piercing of a fuel tank, a battery system or a wing of the aircraft.

The present invention now allows a defined breaking movement for such a crash situation. If the landing force succeeds a predetermined threshold which is also called a breaking load the fuse pin as described above will break at this defined threshold. In other words, when there is a crash or an emergency landing also called hard landing which has an increased landing force above that threshold, not only the shock absorber will start absorbing but when the threshold is arrived or succeeded the pin will break. The breaking of the pin will stop and deactivate the shock absorbing functionality and loosen the connection at the fuse pin due to the break of that fuse pin. In other words, the shock absorber is thereby disconnected from the load path between the wheel and the fuselage of the aircraft and thereby the mentioned folding movement can take place. Thus, during evolution of a regular landing to a hard landing, the regular absorbing movement is transformed into the mentioned crash movement. The end of the crash movement is a crash position, for example positioning the components folded in a horizontal displacement. In other word, the crash movement is a natural evolution of the regular absorbing movement.

While the folding movement regularly is only carried out between an extended landing position and compressed landing position due to the detachment to the shock absorber now the shock absorber is out of the way and the folding movement can continue into a crash position. Due to the fact that this folding movement is now in a controlled and predetermined the crash position is also a defined position. Additionally, due to the detachment of the shock absorber the shock absorber also can move freely at least around one bearing or one hinge and thereby get out of the way of the folding movement of the attachment lever as well as the wheel. As it can be seen from above, in contrast to commonly known landing gears the inventive landing gear is in a crash situation divided into two separate movable parts, namely the shock absorber on one side and the attachment lever with the wheel on the other side. Due to that detachment an additional level of freedom is opened up and in particular the attachment lever can fold in into crash position which lies completely under the cabin of the aircraft. Due to the same detachment process also the shock absorber can move freely into a folding position which can be considered a predefined crash position and which is also straight along the lower wall of the cabin of the aircraft.

As discussed above, the inventive landing gear now allows a predefined breaking situation for a crash landing which allows a predefined folding movement for the attachment lever with the wheel as well as for the detached shock absorber thereby allowing to reach a crash position for both main parts of the landing gear which is a crash position specifically outside or at least below of the cabin of the aircraft. Since those crash positions of all parts of the landing gear are outside of the cabin of the aircraft a piercing of the aircraft by those parts is avoided completely.

As it will be discussed later that risk is further decreased by providing further technical features guiding that folding movement and providing a construction that allows an even more and optimized reach of those crash positions by all of the involved parts of the landing gear.

According to the present invention it can be an advantage if the wheel axis of the landing gear is located behind the wheel connection of the shock absorber in forward direction. According to this application a forward direction is defined as the forward direction of the aircraft which is defined by the nose of the aircraft itself. Having the wheel axis located behind the wheel connection assists the folding movement as described above. Once at the wheel connection a fuse pin breaks, the detachment of the shock absorber now leads to a situation wherein the wheel axis is providing a lever with the attachment lever moving along the mentioned folding movement just by the landing force applied from the aircraft while the wheel remains on the ground. Thereby having the wheel axis in the alignment of a position behind the wheel connection helps the folding movement as described above and to reach the crash positions of all of the involved parts.

Additionally, it can be an advantage if the wheel of the landing gear has a wheel axis located behind the absorber connection in forward direction. The wheel with the wheel axis located behind the absorber connection is basically similar to the solution above which thereby provides an additional lever arm which increases the stability of the folding movement as described above.

Also, an advantage can be achieved if the wheel of the landing gear of the present invention has a wheel axis located behind the lever connection in forward connection. Again, this provides a lever arm of the attachment lever which allows an involvement of the landing force in a crash situation that now assists to arrive at the crash positions for all of the involved parts in stable and optimized manner.

A further advantage can be achieved if the wheel connection of the invented landing gear is located behind the absorber connection in forward direction. Again, this is a construction possibility that assists the folding movement of the different parts after the detachment of the fuse pin into the different positions.

Also, an advantage can be achieved if the wheel connection and/or the absorber connection of the inventive landing gear are located behind the lever connection forward direction. Again, this is a construction helping and assisting the folding movement into the crash positions for all parts.

All relative positions mentioned in the paragraphs above are related to assisting the folding movement into the crash positions. Of course, they can be combined freely to provide multiple optimisation options that assist the folding movement. Moreover this of course can also be constructed completely mirrored so that every relative position as described above is related to a backward direction of the aircraft itself.

A further advantage can be achieved if according to the present invention the lever connection of the landing gear, the absorber connection and the wheel connection are located in a plane parallel or substantially parallel to the forward direction. Such a plane is in particular extended vertically or at least substantially vertically so that the folding movement will also take place in that single in particular vertically extended plane. Beside the fact that this is an optimized aerodynamic situation since the landing gear comprises in this direction the minimum air resistance in the forward direction in particular if this is related to a fixed landing gear, further advantages can be achieved with this embodiment. Since the break of the fuse pin leads to a folding movement and the folding movement is now taking place in a singular vertical extended plane a further and optimized stability against side breakout is provided for that folding movement. This allows the predefined crash positions to be reached in a safer way such that in a crash situation the crash position for all parts of the landing gear will be reached safely.

Also, an advantage can be achieved if according to the present invention the attachment lever of the landing gear has a straight or at least generally straight extension from the lever connection to a wheel axis of the wheel. In particular the wheel connection of the shock absorbers can be connected to the attachment lever between the lever connection and the wheel axis. This is one possibility of a so-called indirect connection between the shock absorber and the wheel since the load path is provided partly by the attachment lever namely in the distance between the wheel axis and the wheel connection. The wheel connection thereby takes on the load path and moves it further at least partly through the shock absorber to provide the shock absorbing functionality. This reduces the need for space in the fold position and further allows a coalignment of the movement directions for the absorbing movement and the crash movement as described later on.

Further an advantage can be achieved if the rotary bearing of the attachment lever of the landing gear has a bearing axis perpendicular or at least substantially perpendicular to a forward direction and/or a wheel axis of the wheel. This leads to a situation where the folding movement can also be considered a backward folding so that forward movement or at least slow forward movement during a vertical landing situation again assists the folding movement itself. Everything that is aligned and directed in or almost or substantially in the crash direction which is described later on, helps and assists the functionality in the crash situation such that the crash positions for all involved parts a reached as secure as possible.

It is also an advantage if according to the present invention the rotary bearing of the attachment lever of an inventive landing gear provides the following movement additionally between the extended landing position and a compressed landing position. In particular an absorbing direction of the folding movement is parallel or coaxial with the crash direction of the folding movement. As already described above with respect to a landing situation of a respectively equipped aircraft the regular landing also needs a movement of the landing gear to provide the regular shock absorbing functionality. Due to the fact that in particular that regular absorbing direction for a regular landing situation is now parallel or in particular coaxial with the crash direction of the folding movement both of those directions and movements are basically identically in terms of their direction. They only differ by the distance the different parts reach. In particular the during regular folding movement of the absorbing movement in the absorbing direction just continues in a crash situation in the same or at least the same direction which is then considered the crash direction of the crash movement. Both of those directions and thereby both of those folding movements are aligned or can be considered to be identical movements so that the crash movement just follows the regular absorbing movement in the identical or at least the identical direction. This increases the inventive advantages even further and optimizes stability of the movement into the crash positions for the involved parts.

A further advantage can be achieved if according to the present invention the fuse pin of the landing gear is located in the pin area of the shock absorber wherein the pin area is provided with at least one guiding surface. Alternatively or additionally the attachment lever can be provided with a counter-guiding surface to provide a guided movement to the shock absorber after the breaking of the fuse pin. That guiding surfaces and counter-guiding surfaces provide the functionality of a guided movement of the shock absorber after its detachment. This allows a further optimization of the inventive landing gear. In particular, after the fuse pin breaks and the detachment of the shock absorber is fulfilled the shock absorber needs to leave the shock absorbing position. To be moved out of this position the guiding surfaces and/or the counter-guiding surfaces help to direct the movement to ensure that the folding movement of all of the parts is at least guided into the crash position or the direction of the crash position.

It is also an advantage that according to the present invention if the guiding surfaces of the landing gear comprise guiding sidewalls and/or the counter-guiding surfaces comprise counter-guiding sidewalls providing side engagement. It can also be considered to be a fork like extension of the guiding surfaces and the counter-guiding surfaces thereby providing side stability for the guided movement after the detachment of the shock absorber. This additionally increases the stability by reducing the risk of a side breakout of the shock absorber after the breaking of the fuse pin.

A further advantage can be achieved if the guiding surfaces and/or the counter-guiding surfaces of the landing gear extend in the plane of the folding movement. As mentioned further above the folding movement can in particular take place in a single plane which advantageously can be a vertical extended plane. To provide the guiding surfaces and the counter-guiding surfaces in the same or a parallel plane allows the optimized stability increase as discussed further above.

It is also an object of the present invention to provide an aircraft for vertical take-off and landing that comprises at least one of the inventive landing gears. Such an inventive aircraft comes with the same advantages as discussed in detail with respect to the inventive landing gear.

BRIEF DESCRIPTION OF THE DRAWINGS

The present invention is described with respect to schematic drawings. Those drawings show.

DETAILED DESCRIPTION OF THE INVENTION

Figure 1:
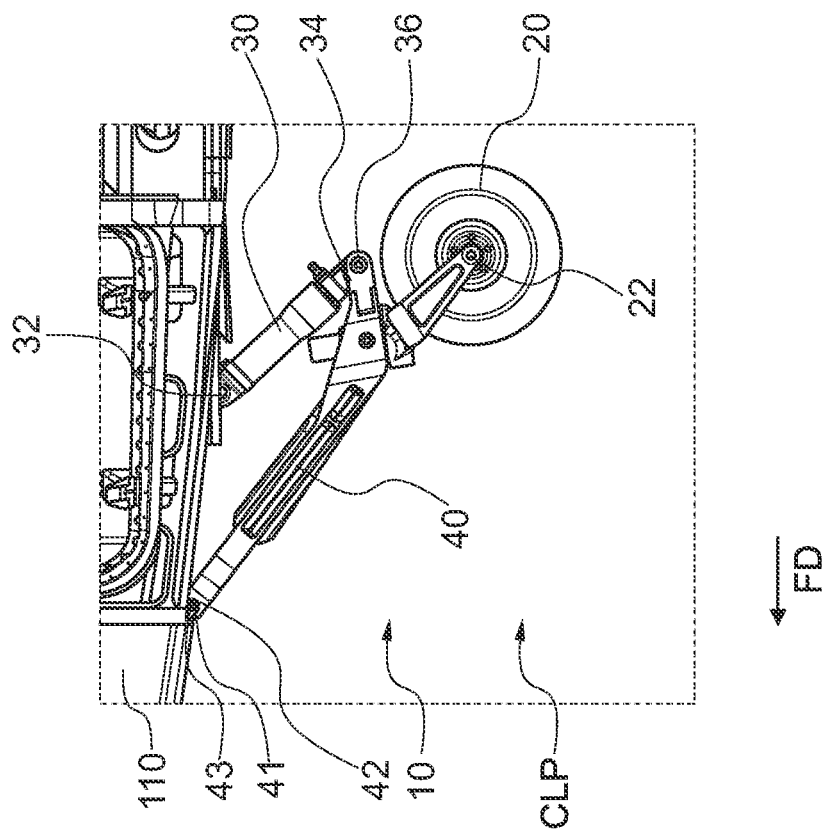
FIG. 1 an embodiment of an inventive landing gear in an extended landing position, FIG. 2 the embodiment of FIG. 1 in a compressed landing position, FIG. 3 the inventive landing gear of FIGS. 1 and 2 in a side view, FIG. 4 a detail view of the wheel connection, FIG. 5 the embodiment of FIGS. 1 to 4 in the crash position, FIG. 6 the embodiment of FIGS. 1 to 4 in respect to an aircraft in a front view, FIG. 7 the embodiment of FIG. 6 in a side view and FIG. 8 one embodiment of an inventive aircraft.
Figure 2:
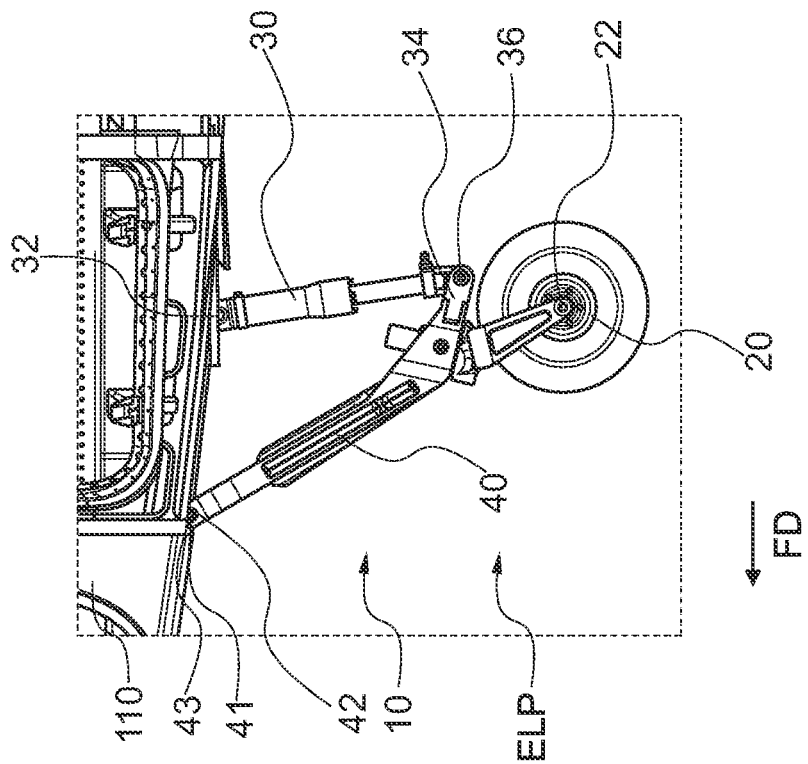
Figure 3:
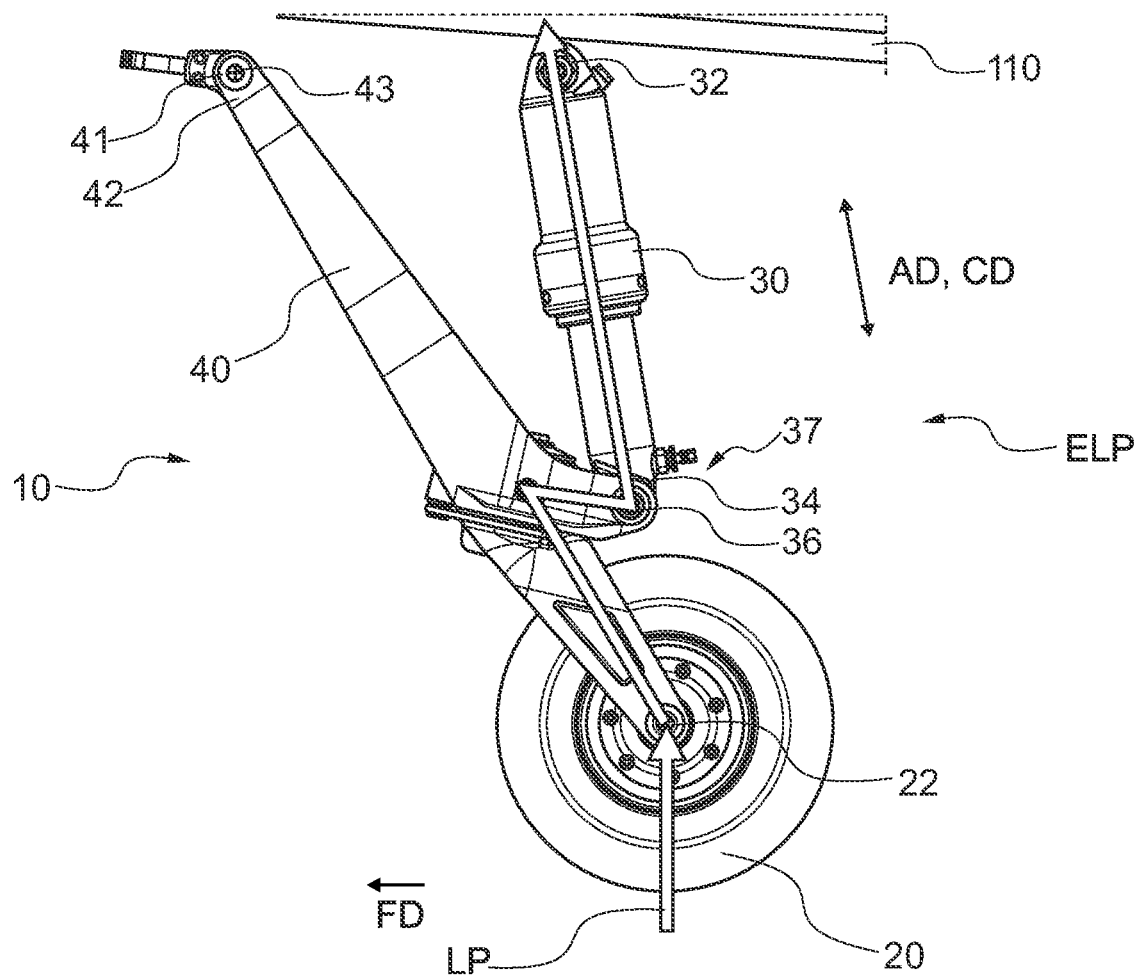

With respect to FIGS. 1 and 2 one embodiment of the landing gear 10 is described for regular functionality. This is a fixed landing gear 10 which is not retractable to the inside of a housing of the aircraft 100. The full landing gear 10 is extended in a more or less vertical plane which is parallel to a forward direction FD of the aircraft 100. In the extended landing position ELP which is depicted in FIG. 1 this landing gear 10 is ready for a landing and touching the ground. While the aircraft slowly decreases altitude this is the position where the landing gear 10 is prepared to touch the ground and take on vertical loads. Once the wheel 20 touches the ground vertical load is moved into the wheel and continues to follow a load path LP which is depicted in FIG. 3. Once this load path LP is established the vertical force is divided and moved along the attachment lever 40 to be moved into the fuselage 110 of the aircraft 100 via a lever connection 42 as well as partly via the shock absorber 30 and moved into the fuselage 110 of the aircraft 100 via the absorber connection 32.

While the vertical load increases due to the continuation of the landing process the wheel 20 is moved into the compressed landing position CLP as depicted in FIG. 2 by the compression of the shock absorber 30. The attachment lever 40 is rigid and thereby first folding movement along an absorbing movement or absorbing direction AD can be seen from FIG. 1 to FIG. 2.

It has to be highlighted, that according to the present invention also a landing gear 10 with a forward folding movement is covered by the scope. In relation to FIGS. 1 and 2 that would be for example a mirrored embodiment, wherein the wheel axis 22 would face in the forward direction FD and would be located left of the lever connection 42. Further in such an embodiment, the shock absorber 30 would be located on the left side of the attachment lever 40.

In FIG. 3 the load path LP is shown which is the main load path LP following the way through the shock absorber 30. In this case a fuse pin 36 is provided in a pin area 37 here at the wheel connection 34. The wheel connection 34 is connected to the attachment lever 40 in between the wheel axis 22 and the lever connection 42. The lever connection 42 here comprises a rotary bearing 41 with a bearing axis 43 which is parallelly extended to the extension of the wheel axis 22. This allows the folding movement of the absorbing movement as described with respect to FIGS. 1 and 2. Also the shock absorber 30 has an absorbing direction AD which is identical to a crash direction CD as this can be seen in FIG. 3.

Figure 4:
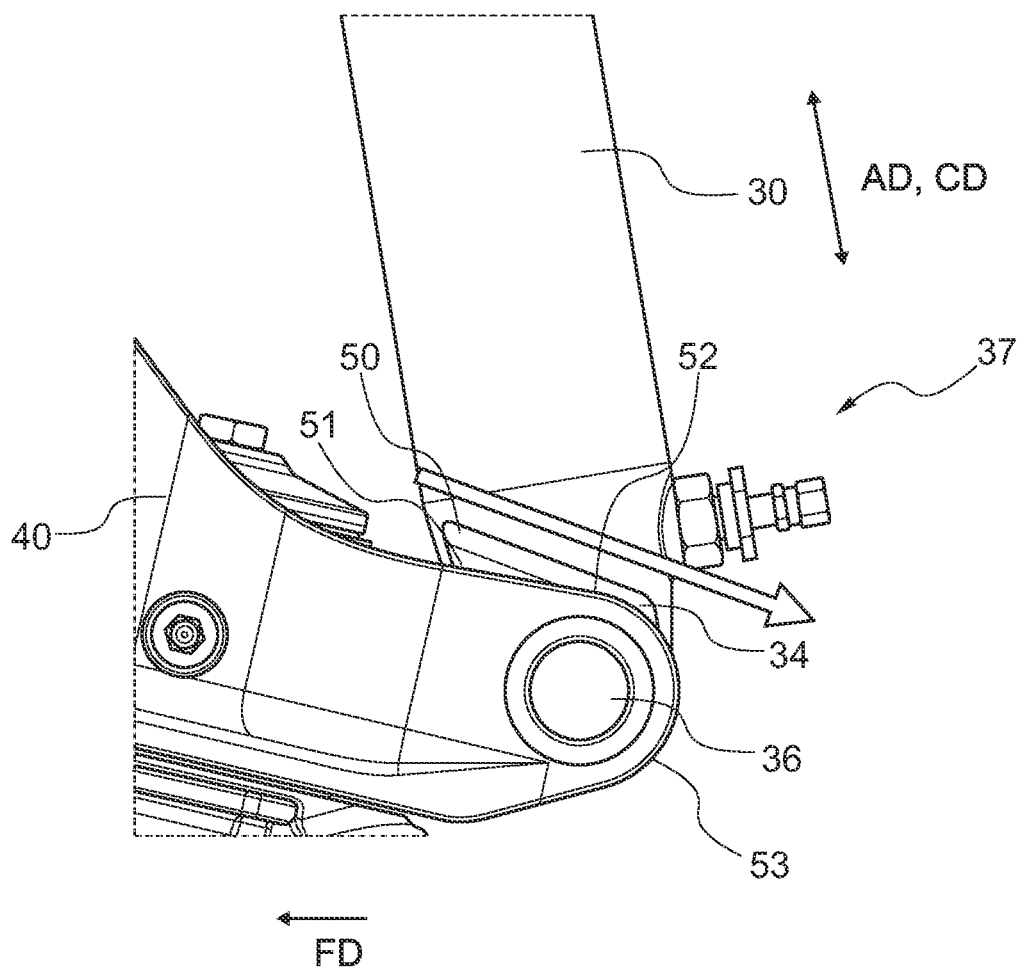

In contrast to the regular landing situation as described above in a crash situation the vertical load increases so much that the compression functionality of the shock absorber 30 is not sufficient to take this additional landing load. This leads to a situation where the fuse pin 36 breaks due to the fact that the load is exceeding a predefined threshold. FIG. 4 shows a situation with a detail view of the fuse spin 36 and the pin area 37. Once the fuse spin 36 breaks the shock absorber 30 is detached from the attachment lever 40 at the wheel connection 34. Thereby and due to this detachment, the shock absorber 30 is now provided with one additional level of freedom of movement which is depicted with the arrow in FIG. 4. To make sure that this movement of detaching the shock absorber 30 in a direction which is also predefined the shock absorber 30 is provided with guiding surfaces 50 as well as the attachment lever 40 is equipped with counter-guiding surfaces 52. To avoid a side breakout risk the guiding surfaces 50 comprise guiding sidewalls 51 engaging with the counter-guiding sidewalls 53 of the counter-guiding surfaces 52 thereby avoiding side breakout and guiding the movement along the arrow in FIG. 4.

Figure 5:
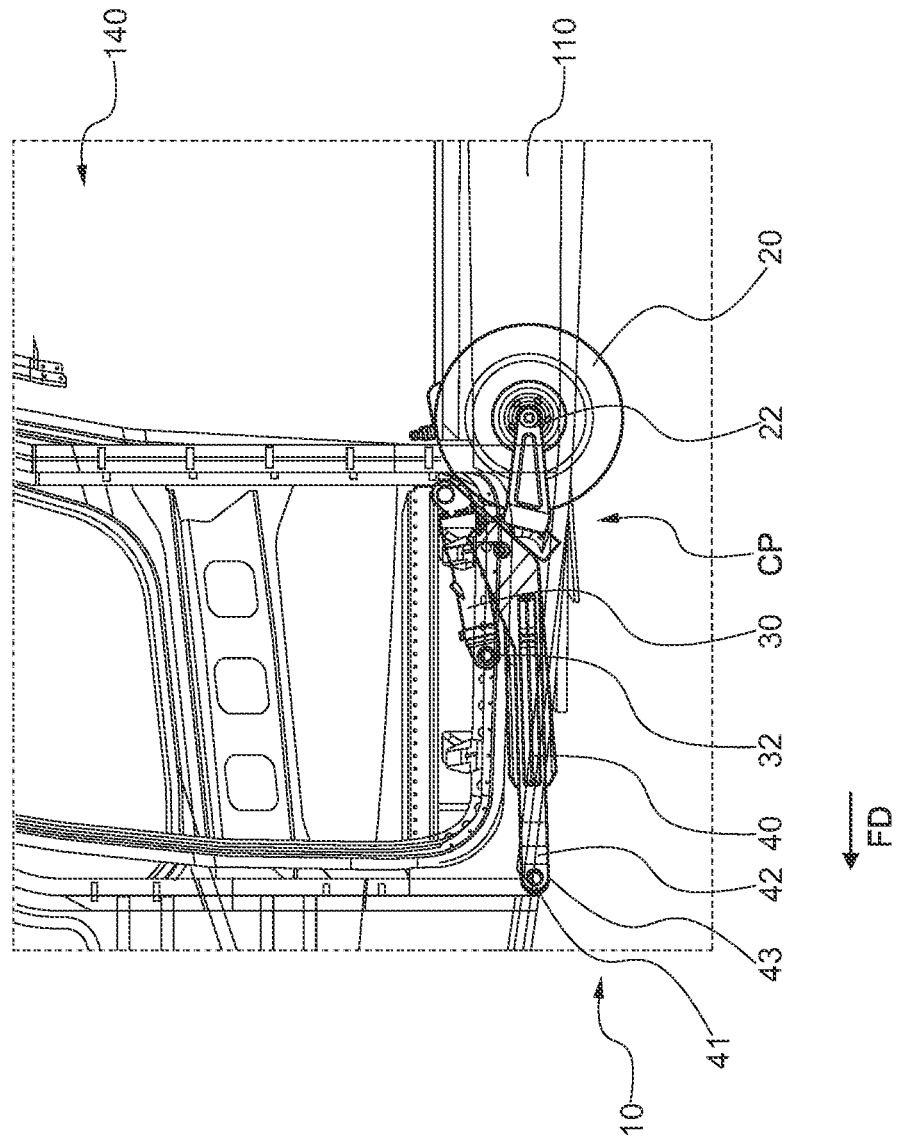

Once the detachment is taking place the folding movement from the compressed landing position CLP into the crash position CP for all involved parts can continue and will end in a situation as depicted in FIG. 5. Due to the detachment of the shock absorber 30 it can fold freely underneath the cabin 140 of the aircraft 100. Also, the attachment lever 40 can rotate around the rotary bearing 41 of the lever connection 52 into the crash position CP also as depicted in FIG. 5. As it can be seen in FIG. 5 due to the detachment of the shock absorber 30 from the attachment lever 40 both of those parts of the landing gear 10 can reach the crash position CP in a folding movement which is a folded crash position and thereby does not enter or pierce into the cabin 140 of the aircraft 100.

Figure 7:
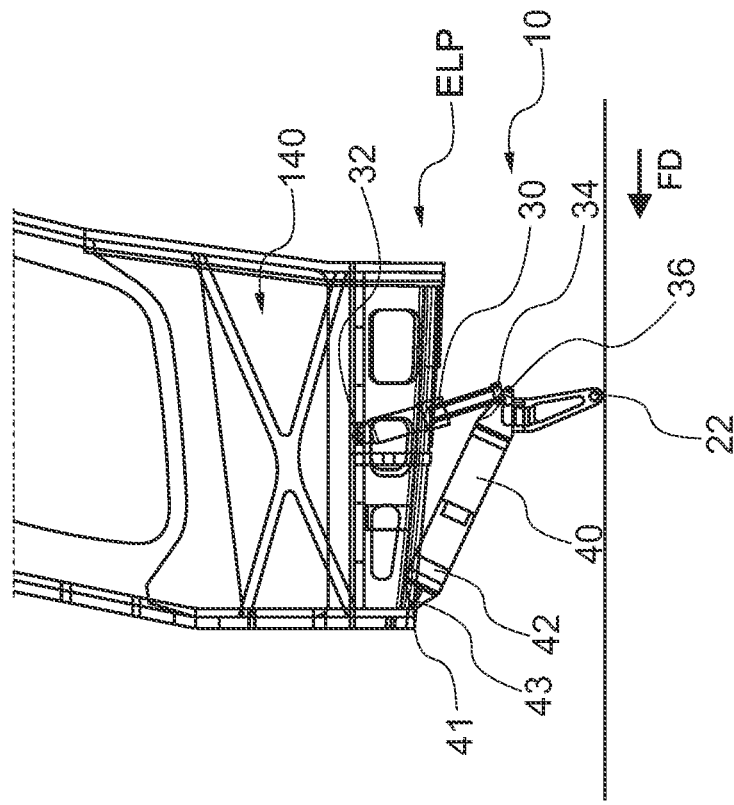
Figure 6:
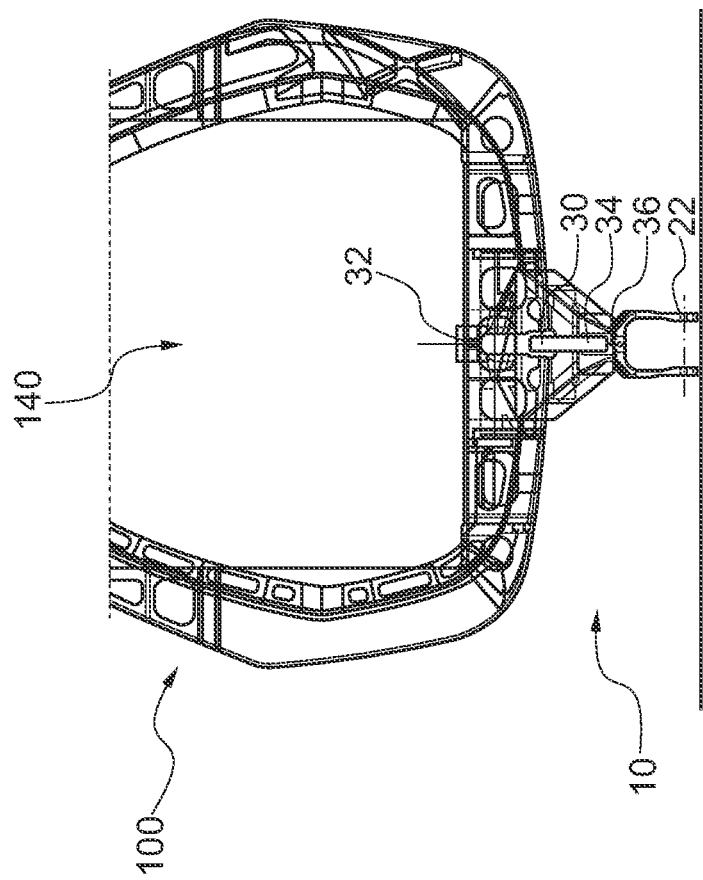

FIGS. 6 and 7 show the embodiment of FIGS. 1 to 5 in a front and side view. It shows in particular the small chamber or hollow area beneath the cabin 140 which gives enough space to take on the attachment lever 40, the wheel 20 as well as the shock absorber 30 in a crash situation.

Figure 8:
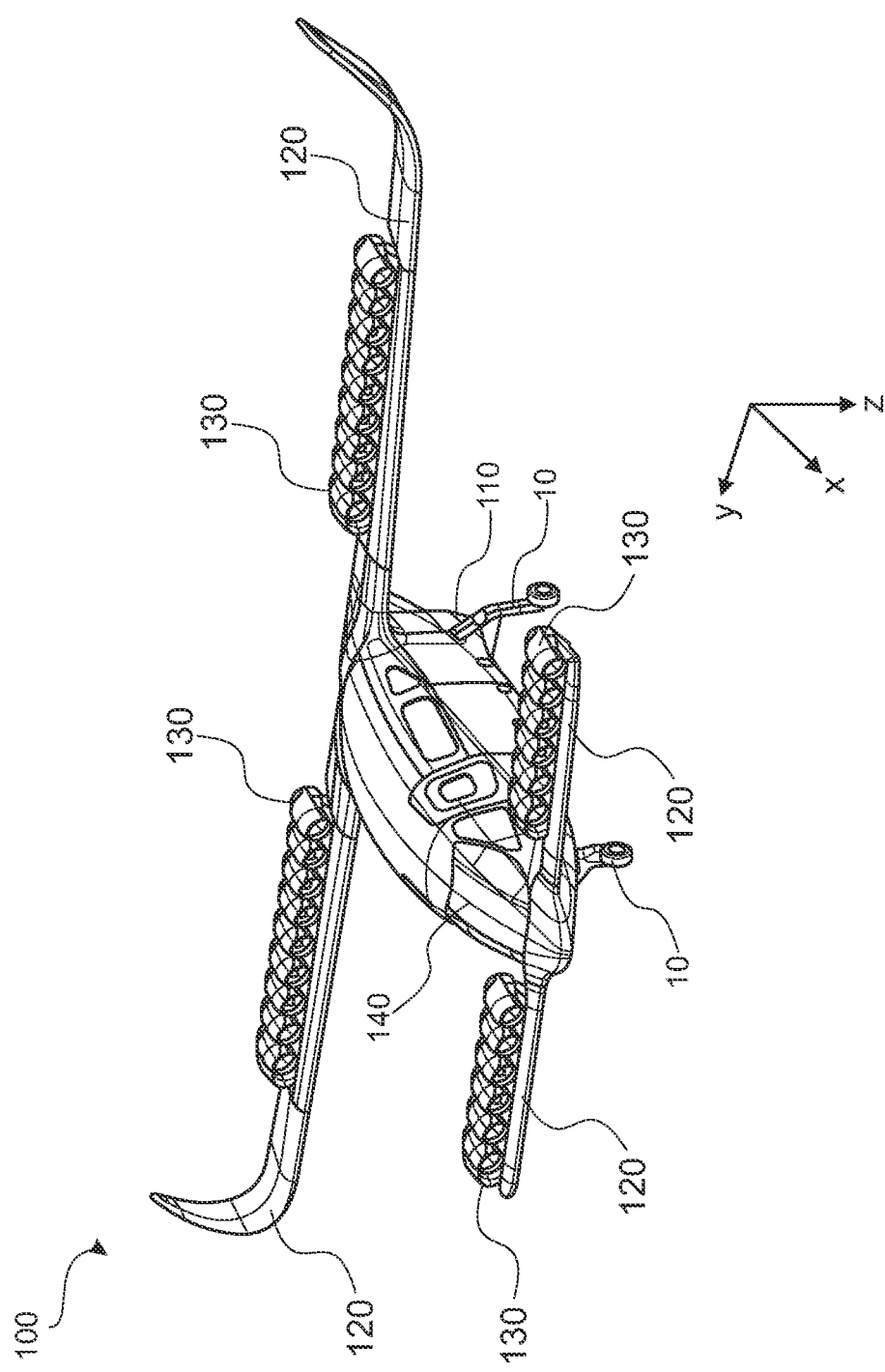

FIG. 8 shows one embodiment of an inventive aircraft 100 which is equipped with an inventive landing gear 10. This is a vertical take-off and landing aircraft 100 with a central cabin 140 with at least one front landing gear 10 and two back landing gears 10. It is equipped with several wings 120 which are also attached to the fuselage 110 and all comprised fan engines 130 to provide a flying force for uplifting and forward movement of the aircraft 100.

The above the description of the drawings describe the present invention only by the way of example.

REFERENCE SIGNS

10 Landing gear
20 wheel
22 wheel axis
30 shock absorber
32 absorber connection
34 wheel connection
36 fuse pin
37 pin area
38 foldable brace
40 attachment lever
41 rotary bearing
42 lever connection
43 bearing axis
44 part-lever
50 guiding surface
51 guiding sidewalls
52 counter-guiding surface
53 counter-guiding sidewalls
100 aircraft
110 fuselage
120 wing
130 fan engines
140 cabin
LP load path
FD forward direction
ELP extended landing position
CLP compressed landing position
CP crash position
AD absorbing direction
CD crash direction

The invention claimed is:
1. A landing gear for a vertical take-off and landing aircraft comprises:
   a wheel;
   a shock absorber with an absorber connection to connect to a fuselage of the aircraft; and
   an attachment lever with a lever connection to connect to the fuselage of the aircraft spaced apart from the absorber connection, the wheel being attached to the attachment lever spaced apart from the lever connection;

wherein the shock absorber is connected to the wheel directly or indirectly via a wheel connection to provide a load path for vertical load from the wheel to the absorber connection;

wherein the shock absorber includes a fuse pin at the absorber connection and/or the wheel connection having a predetermined breaking load to break and release the connection at the absorber connection and/or the wheel connection, the wheel connection being located rearward of the absorber connection relative to a forward direction of the aircraft when the wheel is in an extended landing position, the absorber connection being located rearward of the lever connection relative to the forward direction of the aircraft, the absorber connection and the lever connection being located in a plane that is substantially parallel to the forward direction of the aircraft; and wherein the attachment lever includes a rotary bearing providing a folding movement for the wheel from the extended landing position into a crash position responsive to the fuse pin breaking.

2. The landing gear of claim 1, wherein the wheel has a wheel axis located behind the wheel connection of the shock absorber in the forward direction.

3. The landing gear of claim 1, wherein the wheel has a wheel axis located behind the absorber connection in the forward direction.

4. The landing gear of claim 1, wherein the wheel has a wheel axis located behind the lever connection in the forward direction.

5. The landing gear of claim 1, wherein the wheel connection and the absorber connection are located rearward of the lever connection in the forward direction.

6. The landing gear of claim 1, wherein the lever connection, the absorber connection, and the wheel connection are located in a second plane parallel or substantially parallel to the forward direction.

7. The landing gear of claim 1, wherein the attachment lever has a straight or at least generally straight extension from the lever connection to a wheel axis of the wheel, and wherein the wheel connection of the shock absorber is connected to the attachment lever between the lever connection and the wheel axis.

8. The landing gear of claim 1, wherein the rotary bearing of the attachment lever has a bearing axis perpendicular or at least substantially perpendicular to the forward direction and/or a wheel axis of the wheel.

9. The landing gear of claim 1, wherein the rotary bearing of the attachment lever provides the folding movement additionally between the extended landing position and a compressed landing position, and wherein an absorbing direction of the folding movement is parallel or coaxial with a crash direction of the folding movement.

10. The landing gear of claim 1, wherein the fuse pin is located in a pin area of the shock absorber, and wherein the pin area is provided with at least one guiding surface and/or the attachment lever is provided with counter-guiding surfaces to provide a guided movement of the shock absorber after the breaking of the fuse pin.

11. The landing gear of claim 10, wherein the guiding surfaces include guiding sidewalls and/or the counter-guiding surfaces include counter-guiding sidewalls providing side engagement.

12. The landing gear of claim 10, wherein the guiding surfaces and/or the counter-guiding surfaces extend in the plane of the folding movement.

13. An aircraft for vertical take-off and landing, the aircraft comprising:
   a landing gear including:
      a wheel; and
      a shock absorber with an absorber connection to connect to a fuselage of the aircraft and at least one attachment lever with a lever connection to connect to the fuselage of the aircraft spaced apart from the absorber connection, the wheel being attached to the attachment lever spaced apart from the lever connection,
   wherein the shock absorber is connected to the wheel directly or indirectly via a wheel connection to provide a load path for vertical load from the wheel to the absorber connection,
   wherein the shock absorber includes a fuse pin at the absorber connection and/or the wheel connection having a predetermined breaking load to break and release the connection at the absorber connection and/or the wheel connection, the wheel connection being located rearward of the absorber connection relative to a forward direction of the aircraft when the wheel is in an extended landing position, the absorber connection being located rearward of the lever connection relative to the forward direction of the aircraft, the absorber connection and the lever connection being located in a plane that is substantially parallel to the forward direction of the aircraft, and
   wherein the attachment lever includes a rotary bearing providing a folding movement for the wheel from an extended landing position into a crash position responsive to the fuse pin breaking, and
   wherein the landing gear is connected to a fuselage of the aircraft.

* * * * *